United States Patent [19]
Stephenson

[11] 3,736,882
[45] June 5, 1973

[54] TRANSPLANTER USING PIVOTAL CUTTER CHAINS

[75] Inventor: Kermit Quinten Stephenson, State College, Pa.

[73] Assignee: Research Corporation, New York, N.Y.

[22] Filed: Sept. 17, 1970

[21] Appl. No.: 73,084

[52] U.S. Cl. .................................101/2 R, 37/191 A
[51] Int. Cl. ................................................A01g 23/02
[58] Field of Search................37/2 R, 191 A, 191 R; 172/100; 143/32 N, 32 P, 32 R, 135 R

[56] References Cited

UNITED STATES PATENTS

| | | | |
|---|---|---|---|
| 3,163,944 | 1/1965 | Whitcomb | 37/2 R |
| 3,534,487 | 10/1970 | Arnaz | 37/2 R |
| 3,618,234 | 11/1971 | Bates | 37/2 R |
| 2,612,362 | 9/1952 | Driehaus | 37/2 R |
| 3,028,691 | 4/1962 | Jeffres | 37/2 R |
| 2,410,203 | 10/1946 | Cully | 37/2 R |
| 2,733,738 | 2/1956 | Block | 143/32 N |
| 2,514,766 | 7/1950 | Judd | 172/100 |
| 3,011,564 | 12/1961 | Dahlgren | 172/100 |

FOREIGN PATENTS OR APPLICATIONS 518,412  11/1955  Canada.............................143/32 N

*Primary Examiner*—Robert E. Pulfrey
*Assistant Examiner*—R. E. Suter
*Attorney*—Stowell & Stowell

[57] ABSTRACT

A machine for digging balled plant material has a pair of complementally inclined endless chain carrying booms with each boom being bodily supported at its upper end for pivotal and swivel self-aligning cutting movement by a vertically orientated linkage that is power actuated by a hydraulic ram in opening and closing movements and controlled in its articulating movements by a timing chain. Each linkage has an upper link pivotally mounted on a leg of a plant straddling frame which is adjustably carried by the hitch of a tractor and a lower link having an inturned end carrying a boom with the booms being relatively inturned. The booms are each provided with a chain carrying cutters and shovels and the booms are swung curvilinearly in complemental unison from inturned forward positions to inturned rearward positions in respect to the frame and a plant material to be balled.

9 Claims, 11 Drawing Figures

INVENTOR
KERMIT QUINTEN STEPHENSON
BY Stowell & Stowell
ATTORNEYS

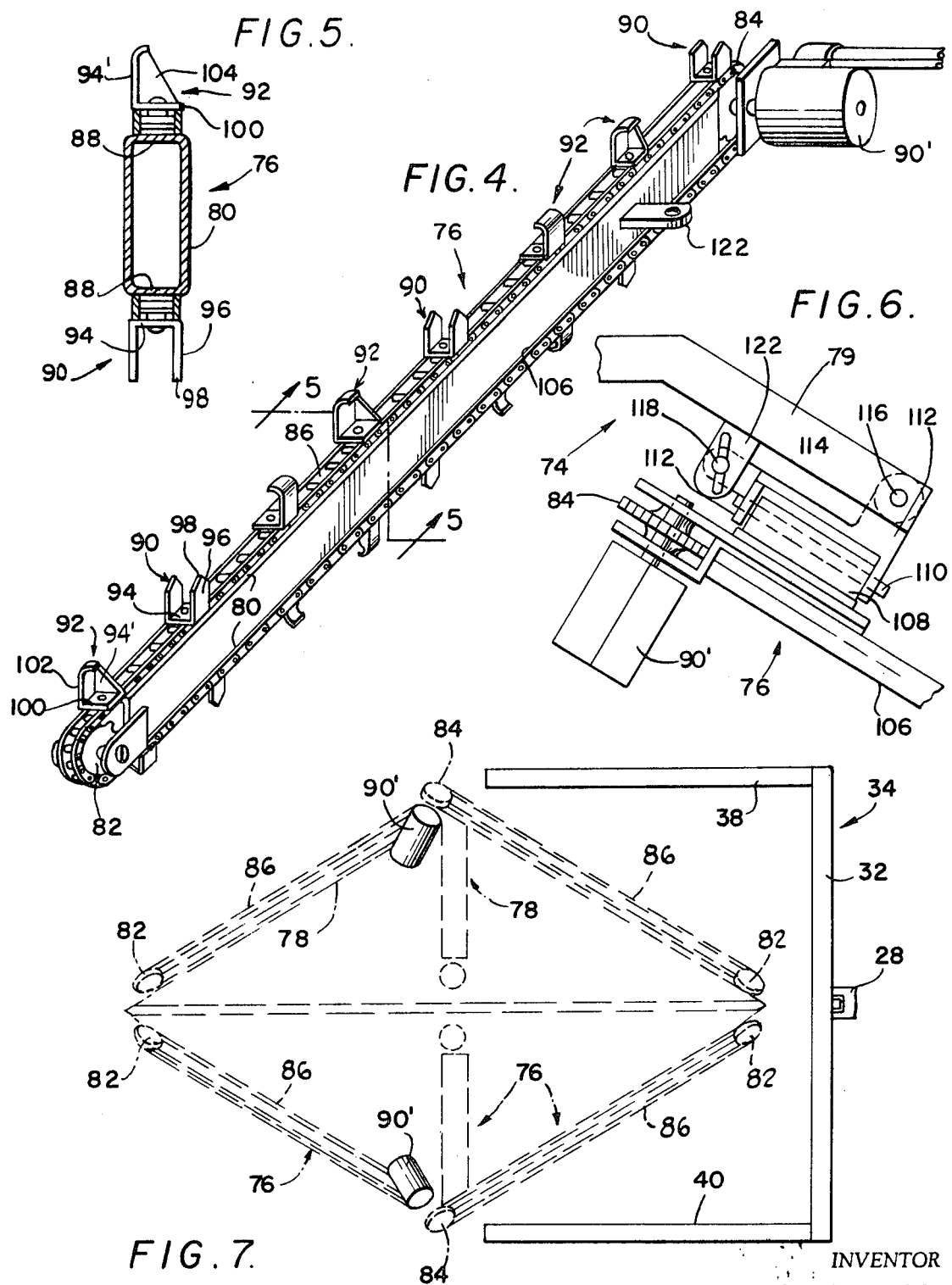

INVENTOR
KERMIT QUINTEN STEPHENSON

BY Stowell & Stowell

ATTORNEYS

TRANSPLANTER USING PIVOTAL CUTTER CHAINS

BACKGROUND OF THE INVENTION

1. Field of the Invention

The present invention appertains generally to improvements in power digging machines and relates more particularly to new and novel improvements in power tools for digging plant materials with balls of earth adhering to the roots thereof.

2. Description of the Prior Art

A recent survey of nurserymen revealed that a general purpose digging machine was one of their most urgent needs. Presently available power digging equipment for digging balled plant materials does not meet the requirements of most nurserymen because such equipment is either too heavy and cumbersome or else too expensive to purchase and operate. The more moderately priced available equipment is usually only satisfactory for relatively soft soil and small size plants.

The types of machines used for digging balled nursery materials are trenching machines which use a single boom cutting tool; large power-shovel machines which use segmented spade-like tools and hydraulic rams; and split-cylinder machines which use a split cylinder type tool to cut a cylindrical soil core.

The first two types are not adapted for digging in close quarters and the third type can cut only a small diameter ball in soft soil conditions. The trencher type machines must be maneuvered about as they make four separate cuts on four sides of a plant. They can not undercut the plant and provide for lifting the ball of earth. Such machines are limited in their use since they cannot be used in close spaces and even in more open spaces they can damage adjacent plants as they are moved about the plant. Power shovel type machines are very heavy and are also expensive since they are mounted on power vehicles and require large power units, preventing their use in close spaces. Split cylinder type machines must be mounted on high clearance tractors of considerable weight; are not generally satisfactory in hard soil conditions and the maximum core diameter is very limited, presently on the order of about 16 inches.

SUMMARY OF THE INVENTION

With recognition of the foregoing drawbacks in known digging machines, it is a primary object of the present invention to provide a general purpose digging machine that is operable with moderate power requirements for digging any desired size of earth ball up to any particular design limit in various soil conditions.

The digging machine of the present invention is moderate in size, power requirements and cost; it can be maneuvered easily for digging in close spaces without damage to adjacent plants, and the machine can dig an approximately hemispherical ball of soil of desired size in soils of different types and in a wide variety of field conditions.

Generally considered, the digging machine comprises a rigid U-shaped supporting frame which is maneuverably carried by the conventional three point hitch of a power tractor so that the spaced apart parallel legs or sections of the U-shaped supporting frame are positionable in various horizontal and vertical angular placements relative to the tractor. The frame is adapted to straddle a plant in a substantially horizontal position and each leg of the U-shaped frame supports at its outer end a vertically articulated scissors linkage that moves in a plane perpendicular to the frame leg. Each linkage is composed of an upper link pivoted to the leg and a lower link joined to the upper link by a movable pivot.

Each lower link has an inturned lower end portion that supports a boom that is disposed parallel with the end portion. An endless chain travels longitudinally of the boom with the chain spacedly carrying appropriate ground engaging cutters and shovels. The chain is driven lengthwise of the boom and around the ends thereof by a hydraulic motor carried by the boom at its upper end. The boom is inclined inwardly from its upper attached end to its lower free end and is moved in a sidewise sweeping curvilinear path by the unfolding and folding action of the linkage.

The upper link of the linkage is swung in a plane perpendicular to the frame leg by a hydraulic ram mounted on the frame. A rotatable pivot shaft assembly, which is attached to the upper link for swinging it under the actuation of the ram, is connected by a timing chain and sprockets to a rotatable pivot shaft on which the upper end of the lower link is mounted. Such pivot shaft is rotatably journalled in bearings on the lower end of the upper link.

The rotating chain driven from the shaft assembly for the upper link controls and effects the swinging of the lower link in the opposite direction from the movement of the upper link with the pivotally joined ends of the links moving forwardly and rearwardly of the vertical plane in which the fixed pivot shaft assembly for the upper link lies. The point of attachment between the lower link and the boom remains in the same vertical plane as the fixed pivot shaft assembly for the upper link but such point moves down and up in such vertical plane and such movement translates with the opening and closing action of the linkage into the curvilinear swinging forward and rearward movements of the inwardly inclined booms. The booms move vertically in a sideways disposition or placement with the cutter chains traveling along the side edges in digging the way for the sweeping booms as they undercut the plant material forming a ball-shaped mass of earth and roots. When the upper and lower links are in lengthwise vertical alignment the booms are at the center of their swing and at the lowest depth of their cut.

Each boom is attached to the inturned lower end portion of the lower link of each linkage by a swivel joint that permits the booms to possess a rolling movement about their longitudinal axes whereby each boom is permitted to self-align with the cut. A positive control means is provided to control the swinging movements of the booms about their swivel joints. Thus, the trailing side edge of the boom follows the cut of the leading edge and the boom swivels under control as it passes through the center position of the cut. The booms in their complemental cutting swinging movements make a rounded side corner diamond shaped surface cut. Each boom is also pivotally attached to its link end portion by a pivot transverse to the linkage swivel joints so that the booms have a fold up movement for transportation purposes. A lock pin arrangement is provided for locking the booms in such folded transportation positions.

The booms move in complemental relation as they are swung by the linkage on each end of the support frame that straddles a plant material. The relatively inturned and declined booms effect a rounded side corner diamond shape pattern of surface cut as they swing curvilinearly from forward inclined starting positions to center straight down positions and then rearward inclined finishing positions relative to the tractor as a reference point. Obviously, the booms could start from rearward inclined positions and be moved through center straight down positions to forward inclined finishing positions relative to the tractor as a reference point. The hydraulic rams for the two linkages are coupled in their actuating movements by suitable control valves. The chain and sprocket coupling transmits reverse rotation to the boom carrying lower link of the linkage with the chain controlling the spreading and collapsing of the linkage. The shape of the ball is determined by the sprocket ratio and geometry of the linkages while the size of the ball is determined by vertical adjustment of the tractor hitch in relation to the ground line.

The tractor can be easily and quickly maneuvered into position to dig a plant directly behind or to either side of the tractor. The dual boom digging machine is then started on one side of the plant and it digs around and under the plant and completes an undercut on the opposite side. A follower lifting attachment can then clamp the ball with the ball and plant being lifted out of the ground by hydraulically raising the tractor hitch.

The relative angle of the cutter booms can be adjusted to completely undercut the plant but considerable portions of the ball often sluff off in soft soil conditions unless an uncut ridge is left to support the ball. Therefore, it is preferred to arrange the booms so that they operate with their free lower ends in a spaced relation, thus leaving the uncut supporting ridge in the ball.

BRIEF DESCRIPTION OF THE DRAWINGS

FIG. 1A is an enlarged diagrammatic fragmentary plan view of the compensating linkage and timing chain with parts in section.

FIG. 1B is a vertical sectional view of the linkage and is taken on line 1B—1B of FIG. 1.

FIG. 4 is a perspective view of one of the two identical cutter booms.

FIG. 5 is a vertical cross-sectional view taken on line 5—5 of FIG. 4 and showing in front elevation the cutter and shovel elements carried by the chain.

FIG. 6 is a fragmentary perspective showing of the swivel coupling and pivotal connection between the boom end and the lower link of the linkage.

FIG. 7 is a diagrammatic showing of the diamond surface cut formed by the dual cutter booms.

DESCRIPTION OF THE PREFERRED EMBODIMENT

Figure 1:
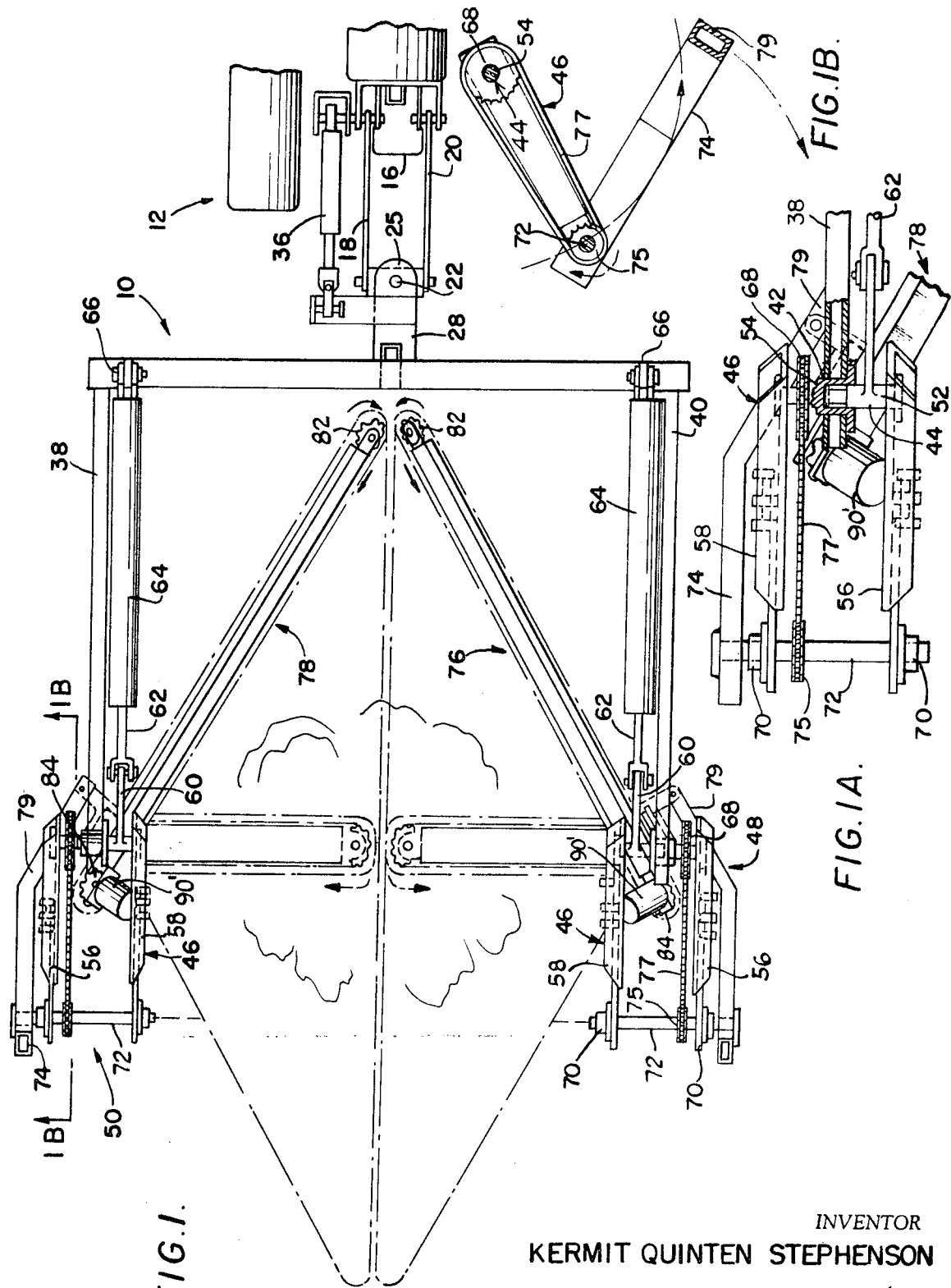
FIG. 1 is a top plan view of the digging machine shown in a finishing operating position with regard to a plant growing in the ground and to the supporting tractor.

Referring now more particularly to the accompanying drawings, the digging machine, generally designated by the reference numeral 10, includes and is operatively mounted on and adjustably positioned by a tractor 12 having a regular three point hitch 14 and provided with a power take-off 16 that is used to drive a hydraulic pump which powers all the hydraulic systems. The upper and lower lift arms, 18 and 20, respectively, of the hitch are attached by vertical pivot pins 22 to upper and lower pairs, 24 and 26, of pivot attachment plates carried by a vertical frame bar 28. The vertical frame bar supports through suitable reinforcements 30 and end cross frame bar 32 of a rigid U-shaped supporting frame 34.

A hydraulic cylinder 36 is operatively connected by universal couplings to the frame bar 28 and the tractor, as shown in FIG. 1, and extends therebetween so as to swing the frame 34 to either side of the tractor about the pivots 22.

The support frame 34 includes the end cross bar 3 and spaced apart parallel side bars or legs 38 and 40. The legs 38 and 40 of the frame 34 are spaced apart so that they can straddle a growing plant material as can be appreciated from FIGS. 1 and 7.

The free ends of the legs 38 and 40 of the supporting frame are provided with transversely disposed bearing openings 42 in which shaft assemblies or structures 44 for the upper links 46 of vertically orientated linkages 48 and 50 are rotatably journalled. Each shaft assembly 44 is composed of a stub shaft 52 rotatably sleeved in a hollow shaft 54. The stub shaft 52 and the hollow shaft 54 are connected to parallel arms 56 and 58 that constitute the upper link. The active arm 56 is fixed to an end of the shaft 52 while the floater arm 58 is fixed to the end of the shaft 54.

The shaft 52 has a bell crank 60 fixed thereto with the bell crank being pivotally attached to the end of a power ram 62 that is workingly carried by a hydraulic cylinder 64 which has its closed end pivotally attached, as at 66, to the end bar 32 of the supporting frame 34. The shaft 54 has a sprocket 68 fixedly circumposed thereon.

The arms 56 and 58 are coterminous and have bearings 70 provided on their outer ends with a cross shaft 72 rotatably journalled in the bearings. The upper end of a lower link 74, that compliments the upper link in defining the complete scissors linkage 48 or 50, is fixed to the cross shaft and located outwardly of the arm 56 in depending angular relation thereto. A sprocket 75 is fixedly circumposed on the shaft 72 and is connected by a chain 77 to the sprocket 68. The sprocket 68 and the sprocket 75 are in the two-to-one ratio with the sprocket 68 being twice the size of the sprocket 75 so that it amplifies the rotation of the sprocket 68 in a two-to-one ratio. In this way, the linear ram motion is amplified and transfered to the angular rotation of booms 76 and 78.

The lower links 74 of each linkage 48 and 50 are bent inwardly at their lower ends to have inturned lower ends 79 that supportingly carry the cutter booms 76 and 78 at their upper ends. The booms extend from the transversely spaced apart and parallel vertically oriented links 74 in an inwardly inclined complemented relation. Each of the cutter booms includes an elongated hollow box frame section 80 having a spring loaded idler sprocket 82 rotatably disposed at the lower end and a drive sprocket 84 rotatably disposed at the upper end.

The sprockets 82 and 84 rotate about parallel axes transverse to the boom frame section and support an endless chain 86 that travels over the opposing side edges 88 of the boom frame. The chain is driven by the drive sprocket 84 which is powered by a hydraulic motor 90' carried by the upper end of the boom section above the points of attachment of the boom and the lower link of the linkage.

Each of the chains 86 carries in spaced fashion a plurality of cutters 90 and shovels 92, as shown in FIGS. 4 and 5. Each cutter is a channel section joined at its web portion 94 to a chain link and having its legs 96 extending outwardly from the chain and terminating in sharp points 98. EAch shovel 92 is an angle iron 94' having a mounting leg 100 attached to a chain link and an outstanding leg 102 terminating in a slight inturned flange. A triangular back web 104 joins the back edges of the two legs so as to outstand from the chain in angular relation to the leg 102.

Each boom is mounted on the inturned end 79 of each lower link 74 of its associated linkage in a way so that it is parallel with the inturned end portion 79 and constitutes a projection thereof and is supported in an inwardly declined fashion by the linkage which articulates in a vertical plane perpendicular to the rigid leg or section 38 and 40 of the horizontally disposed supporting frame 34 with the boom being swung curvilinearly in an arcuate path from a rearwardly inclined position to a forwardly inclined position. Each boom has an inwardly facing side face 106 that is provided adjacent the upper end of the boom with an open ended bearing sleeve 108 in which a swivel pin 110 is rotatably mounted with the pin being carried at its ends by the parallel arms 112 of a bracket 114 that has one corner pivoted by a hinge pin 116 to the inturned free end 79 of the lower link 74 of each linkage. The hinge pin 116 has its axis perpendicular to the parallel horizontal axes of the pivot shaft assembly 44 and the pivot shaft 72.

By virtue of such mounting construction, each boom has a bodily rolling swivel movement about its longitudinal axis. Thus, the cutter booms are self-alignable with the cut so that the trailing edge follows the leading edge and the cutter booms will roll or swivel about their longitudinal axes as they pass in unison through the center portion of their cut.

Means is provided for continuously moving the cutter booms about their swivel points throughout a cut thus resulting in an approximate diamond shaped surface cut with more rounded center angular points. By providing a positive control means jamming of the booms against the side walls of the cut is obviated.

Figure 8:
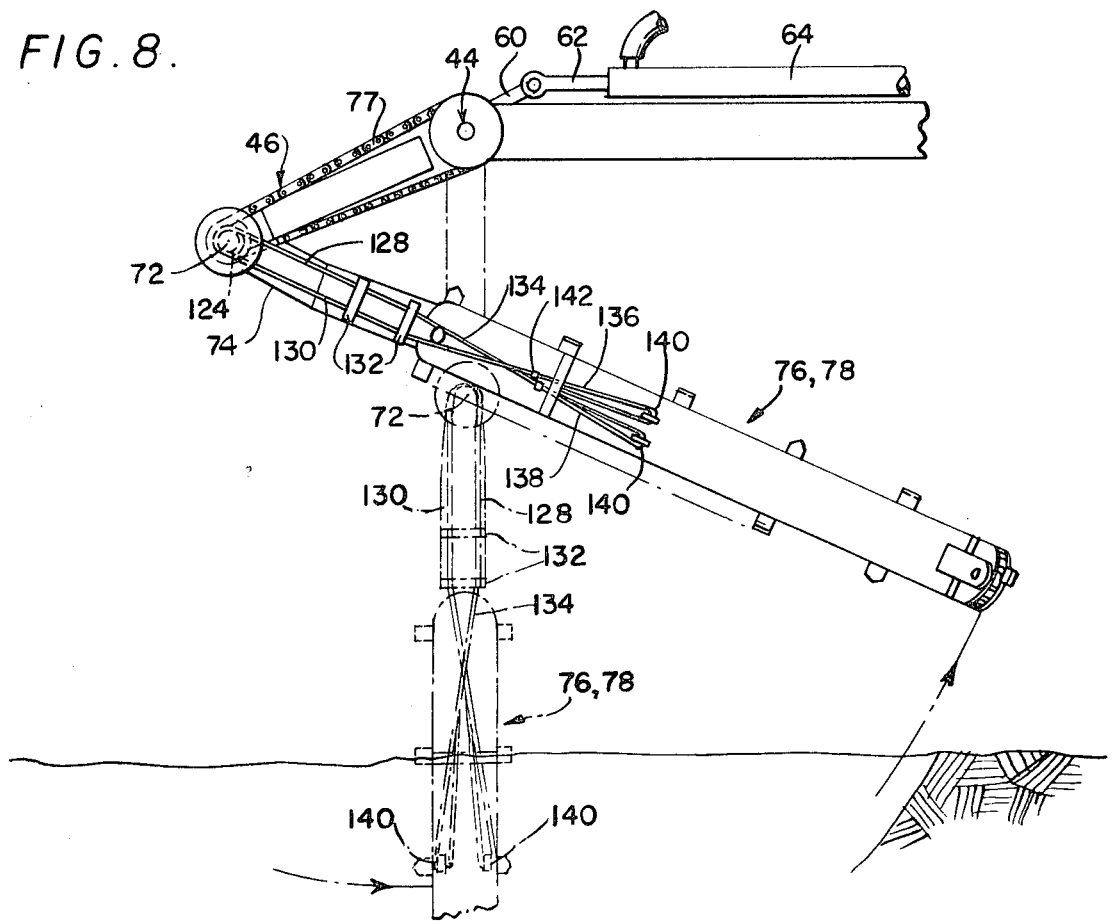
FIG. 8 is a side elevational view of the interior side of one of the booms and linkage, showing in side elevation a control cable arrangement for controlling the swivel movement of the boom.
Figure 9:
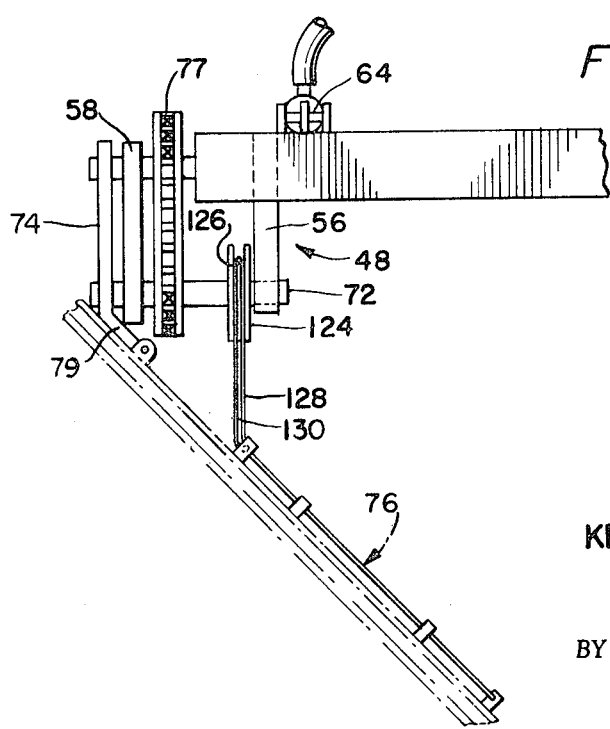
FIG. 9 is a rear elevational view showing the control cable arrangement illustrated in FIG. 8 from the rear of the machine.

Such swivel control means, as shown more clearly in FIGS. 8 and 9, includes a cable drum 124 fixed on the cross shaft 72 and having a cable 126 wrapped therearound. The reaches 128 and 130 of the cable in extension from the drum 124 are guided through guides 132 and are crossed over upon themselves, as at 134, with the reverted terminal ends 136 and 138 of the crossed cable reaches being attached to eyelets 140 on the inner face of the boom. The cable ends are held by cable clamps 142.

As shown most particularly in FIG. 6, each boom is locked in a raised or folded position about its pivot 116 by a lock pin 118 carried by a lateral offset 120 on the bracket and engaging an apertured ear 122 that extends from the lower link.

Figure 2:
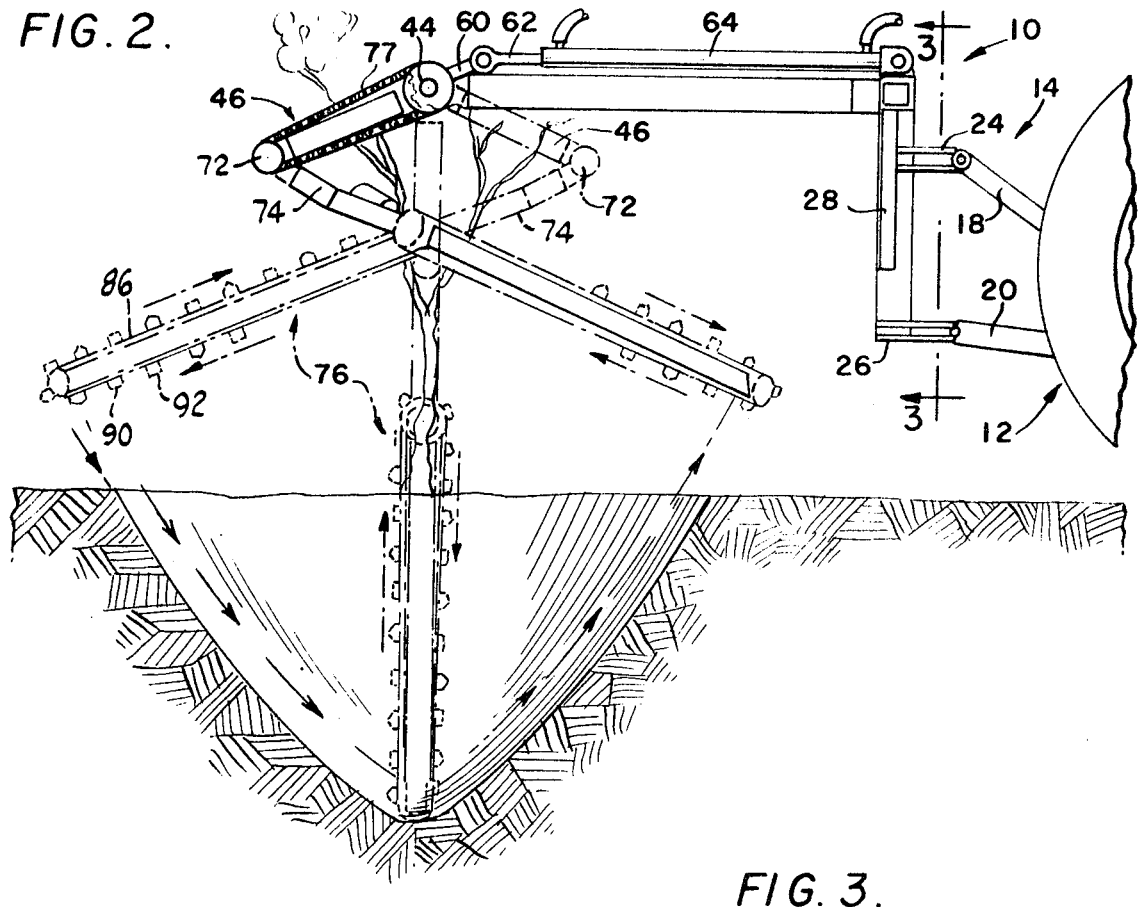
FIG. 2 is a side elevational view of the digging machine with the boom and the scissors linkage shown in full line in the "finish" position and in dotted line "start" position in regard to the ball of the plant that has been undercut.
Figure 3:
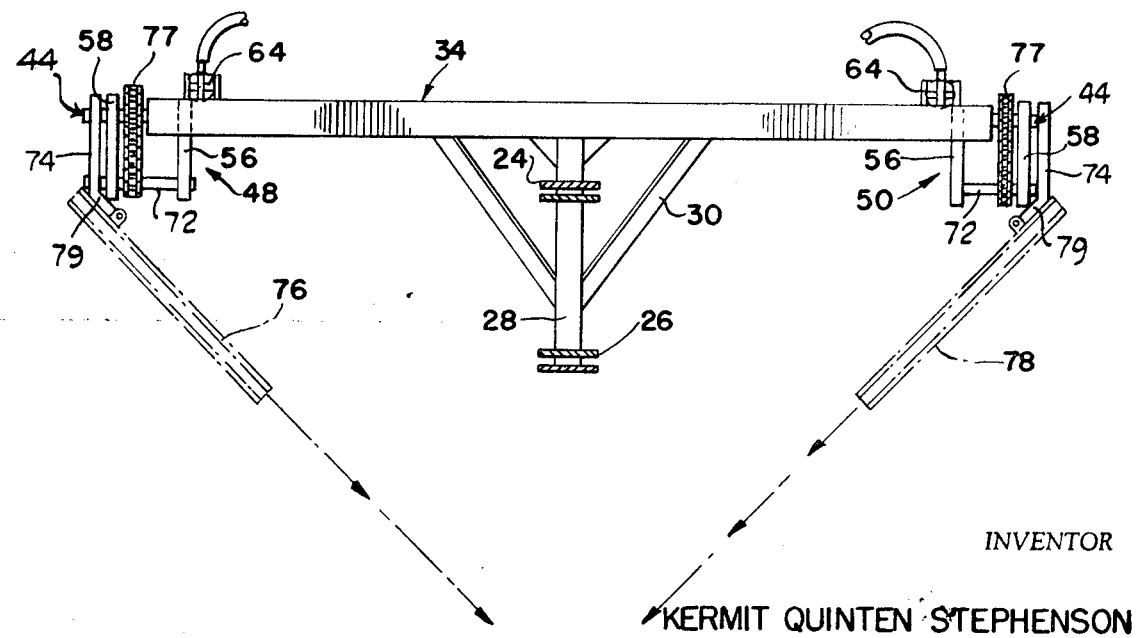
FIG. 3 is a vertical sectional view taken on line 3—3 of FIG. 2 and is a rear elevational view of the tool showing the supporting frame principally in elevation and partly in vertical section.

In use, the digging machine 1 is self positioned through normal operation of the tractor 12 so that the frame legs 38 and 40 straddle a growing plant, as shown in FIGS. 1, 2 and 7. In such position, with the operator on the tractor as a reference point, the linkages are folded rearwardly, as shown in dotted lines in FIG. 2, and the cutter booms are extended out and forward of the plant as shown in dotted lines in FIG. 2. The hydraulic cylinders 64 are operated in unison through actuation of suitable valve controls (not shown) so that the rams 62 start and complete their power strokes together. The shafts 52 of each shaft assembly 44 are rotated counterclockwise (FIGS. 1 and 1B) to swing the arms 56 of the upper links 46 downwardly and forwardly. This action is transmitted to the float arms 58 which swing evenly with the arms 56 and also cause counterclockwise rotation of the sprockets 68. The sprockets 68 through the chains 77 rotate the sprockets 75 fixed on the lower link carrying shafts 72. The chains rotate in a counterclockwise direction and moderate the lower lower links 74 which are lowered in a downward constrained movement by the chains.

As the lower links 74 swing down and rearward they carry the cutter booms 76 and 78 rearwardly in a complemental sweeping action starting to undercut the plant. The upper and lower links are spread apart until they reach the aligned straight down position, as shown in dotted lines in FIG. 2, and, at this time, the cutter booms 76 and 78 are at their center points of lowest depth, as shown in FIG. 7, and the booms 76 and 78 are turning about their longitudinal axes in following the line of the cut (FIG. 7) with the swivel control cables 126 (FIG. 8) controlling the swivelling movements of the booms 76 and 78.

The power rams 62 and the chains 77 now start to move the scissor linkages 48 and 50 in a forwardly collapsed position, as shown in full lines in FIG. 2. The upper links 46 are being pushed by the rams 62 while the lower links 74 are being pulled by the chains 77. When the linkages 48 and 50 reach the fully collapsed forward position, as shown in full lines in FIG. 2, the cutter booms 76 and 78 have reached the end of their cut and are now rearward of the linkages 48 and 50, as shown in full lines in FIG. 2.

While the digging machine is shown in working association with a tractor, it could be mounted on its own ground engaging portable frame. Also, instead of hydraulic cylinders 36 and 64, chain and sprocket arrangements may be used. Thus, it can be appreciated that many changes may be effected as come within the spirit and scope of the appended claims which define the invention that is not to be restrictively interpreted by the foregoing description, Abstract of the Disclosure, or the attached drawings.

What is claimed is:

1. A machine for digging balled plant material comprising a maneuvarable frame adapted to be positioned in adjacency to a plant and having a pair of supporting frame sections, a vertically oriented linkage means depending from each frame section and including an upper link pivotally carried by each frame section and a lower link pivotally connected to the upper link, a boom pivotally connected to the lower link of the linkage means on each frame section and depending therefrom, said booms being positioned by said linkage means in inwardly inclined complemental positions relative to the frame sections, cutter means carried by each boom, and means for actuating the linkage means to swing the booms in complemental curvilinear cutting paths under the plant and from one side to an opposing side thereof.

2. The machine of claim 1 wherein a ground engaging wheeled vehicle having a lift means is provided and said frame is carried by the lift means.

3. The machine of claim 2 wherein said vehicle is a tractor and said frame is U-shaped and has a transverse end section pivotally connected to the lift means and parallel spaced apart legs defining said frame sections.

4. The machine of claim 3 wherein said legs have outer free ends and said linkage means pivotally depend from the free ends of said frame legs and the booms are positioned in inwardly declined complemental positions relative to the frame legs.

5. The machine of claim 1 wherein said means for actuating the linkage means includes a power ram carried by the frame and drivingly connected to the upper link.

6. The machine of claim 5 and further including means drivingly connected between the upper link and the lower link for moving the lower link in one rotational direction in response to movement of the upper link in the opposite rotational direction.

7. The machine of claim 1 further including a swivel connection between each of the lower links and the booms providing each boom with a bodily swivel movement about its longitudinal axis relative to its links and means controlling the bodily swivel movement of the booms.

8. The machine of claim 1 wherein each of said cutter means includes an endless driven chain entrained lengthwise over its boom and spacedly carrying outstanding cutters and shovels.

9. The machine of claim 8 and a hydraulic motor carried by each of the booms and drivingly connected to the chain thereon.

* * * * *